No. 666,788. Patented Jan. 29, 1901.
E. ABERLI.
APPARATUS FOR REPRODUCING MAPS AND CHARTS.
(Application filed Apr. 5, 1900.)
(No Model.)
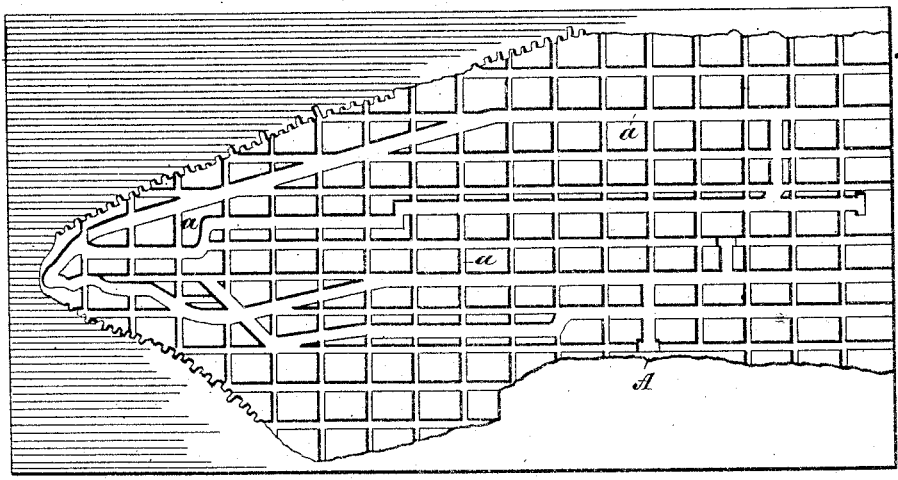
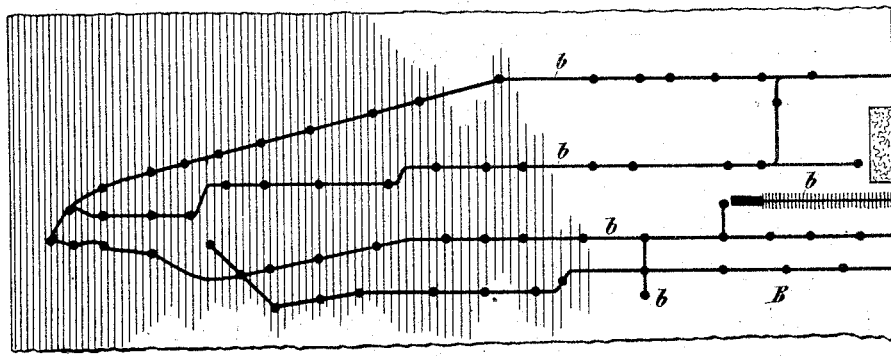
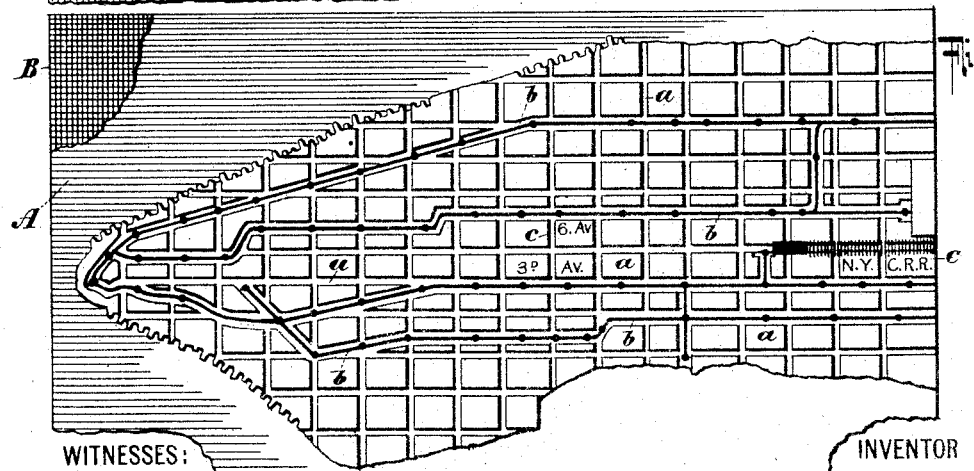

UNITED STATES PATENT OFFICE.

EDWARD ABERLI, OF BUFFALO, NEW YORK.

APPARATUS FOR REPRODUCING MAPS AND CHARTS.

SPECIFICATION forming part of Letters Patent No. 666,788, dated January 29, 1901.

Application filed April 5, 1900. Serial No. 11,565. (No model.)

*To all whom it may concern:*

Be it known that I, EDWARD ABERLI, a citizen of the United States, residing at Buffalo, Erie county, State of New York, have invented certain new and useful Improvements in Apparatus for Reproducing Maps and Charts, of which the following is a specification.

Heretofore in the reproduction of maps and charts it has been customary to employ several engraved stones, each of which embodies some of the features contained in the finished map or chart. Thus, for instance, it has been common to engrave the ground plan of the map on one stone, to engrave the designations of streets, &c., on a second stone, and to engrave the railroads on a third stone, and then cause each map to be printed three times, once from each stone. Aside from the fact that this is a very difficult and expensive process it has been found in practice to be almost impossible to obtain perfect registry of the various imprints upon a single sheet, and these difficulties in the reproduction of maps and charts by this method have long been understood and deplored.

The object of my present invention is to overcome these and other difficulties inherent in methods for reproducing maps and charts heretofore employed and to provide an inexpensive and efficient apparatus for reproducing maps and charts whereby much time will be saved in such reproduction and a superior article produced wherein perfect registration will be provided.

To these ends my invention consists in the new and improved apparatus for reproducing maps and charts, to be hereinafter described and claimed.

In order that the invention may be readily understood, reference is made to the accompanying drawings, wherein—

Figure 1 is a ground plan of a map—say, for example, the city of New York. Fig. 2 is a view of a separate chart, showing only the elevated roads in the city of New York. Fig. 3 is a view showing the maps illustrated in Figs. 1 and 2 superposed. Fig. 4 is a section of the structure shown in Fig. 3, the sheets being of exaggerated thickness.

In accordance with my invention a ground-plan map or chart A, with streets $a$, &c., is first made upon some suitable transparent material, such as celluloid. A second auxiliary map or chart B (or as many as may be desired) is then prepared in a like manner upon a suitable transparent material, such as celluloid. Each of these auxiliary charts contains only the matter to be added to the ground-plan map. Thus, for instance, the auxiliary chart B (represented in Fig. 2 of the drawings) merely illustrates the elevated and steam railroads $b$ in the city of New York. The designation $c$ (represented in Fig. 3) is shown as produced upon a third transparent chart C, merely having such designations. The plurality of charts or maps should be so constructed that the different markings on each of the sheets may be readily brought into proper relation to the markings on the other sheets in order that when superposed the whole will present a complete map, with the characters upon the auxiliary map or maps appearing in the proper position upon the ground plan and a perfect register being given. A simple manner in which to achieve this end is to make all of the transparent sheets of exactly the same size, and after the ground plan is produced a second transparent sheet can be placed over it, and the elevated roads, for instance, can be drawn upon the second sheet in the position they occupy in the ground plan. When the various charts which go to make up the completed map have been produced in the manner described, the transparent sheets are placed removably one on the other, so that the markings on the separate auxiliary sheets occupy proper positions on the ground plan. A photograph is then taken, preferably upon metal, of what appears upon the plurality of superposed charts. The metal is then etched in the usual or any preferred manner, and a single plate is thus provided from which the matter contained upon the plurality of transparent sheets can be reproduced.

It often occurs that maps are to be used for specific purposes and that it is desirable to omit therefrom everything except the ground plan and the special designations required to be shown. Thus some maps only show good roads on the ground plan, others railroads, others points of interest, and so on.

It will be seen that in accordance with my invention these special maps can be readily reproduced at little expense. It merely requires that a ground plan free from all special designations shall be provided, and any desired additional matter can be provided upon separate sheets at little expense and the whole photographed upon metal and etched, as has been hereinbefore described. By providing a series of charts or maps of transparent material capable of being brought into registry with relation to each other and of being readily removed from contact with each other I am able to employ a single ground plan and to use a variety of sheets containing a variety of information for use therewith, so that the component parts of the structure may be used over and over again.

It is obvious that the lowermost auxiliary plate carrying the ground plan may be opaque and a photograph of the complete map taken through the transparent plates and the printing-plate be reproduced therefrom in this manner.

Having described my invention, what I claim, and desire to secure by Letters Patent, is—

1. A device for use in producing, by photolithography, a printing-surface for maps or charts, &c., comprising a sheet having thereon a ground-plan map, and a superposed light-transmitting sheet containing designations so arranged that they may be read in their proper positions on the ground-plan map, as set forth.

2. A device for use in producing by photolithography a printing-surface for maps or charts, &c., comprising a sheet having thereon a ground-plan map, and a plurality of light-transmitting sheets each bearing different characters or designations so arranged that they may be read in their proper positions on the ground-plan map and adapted for conjoint use with the ground-plan map as set forth.

EDWARD ABERLI.

Witnesses:
 LA VERNE DOREMUS,
 FREDERICK STRADE.